US012272326B2

(12) United States Patent
Shin

(10) Patent No.: US 12,272,326 B2
(45) Date of Patent: Apr. 8, 2025

(54) DISPLAY DRIVING APPARATUS AND DISPLAY DRIVING METHOD

(71) Applicant: LX SEMICON CO., LTD., Daejeon (KR)

(72) Inventor: Hyeon Woon Shin, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/405,854

(22) Filed: Jan. 5, 2024

(65) Prior Publication Data

US 2024/0233668 A1 Jul. 11, 2024

(30) Foreign Application Priority Data

Jan. 9, 2023 (KR) ........................ 10-2023-0002702

(51) Int. Cl.
*G09G 3/36* (2006.01)
*G09G 3/20* (2006.01)

(52) U.S. Cl.
CPC ......... *G09G 3/3607* (2013.01); *G09G 3/2096* (2013.01); *G09G 2320/0242* (2013.01); *G09G 2354/00* (2013.01); *G09G 2360/16* (2013.01)

(58) Field of Classification Search
CPC ............... G09G 3/3607; G09G 3/2096; G09G 2320/0242; G09G 2354/00; G09G 2360/16
See application file for complete search history.

(56) References Cited

U.S. PATENT DOCUMENTS

2015/0145895 A1* 5/2015 Won ..................... G09G 3/3406 345/88
2015/0161933 A1* 6/2015 Wu ......................... G06F 3/013 345/690
2015/0179136 A1* 6/2015 Miller ...................... G09G 5/04 345/690
2016/0027365 A1* 1/2016 Kempf ................. G09G 3/2003 345/690
2016/0293139 A1* 10/2016 Kwon ................. G06F 3/03547
2021/0020118 A1* 1/2021 Kang .................. G09G 3/3413

FOREIGN PATENT DOCUMENTS

CN 108074540 A 5/2018

OTHER PUBLICATIONS

Extended European Search Report dated May 10, 2024, issued for the corresponding European patent application No. EP 23218940.7, 10 pages.

* cited by examiner

*Primary Examiner* — Amare Mengistu
*Assistant Examiner* — Jennifer L Zubajlo
(74) *Attorney, Agent, or Firm* — ROTHWELL, FIGG, ERNST & MANBECK, P.C.

(57) ABSTRACT

A display driving apparatus includes an average calculator for each frame configured to calculate an average blue image signal as an average of blue image signals configuring one frame, a gain calculator configured calculate a frame gain for correcting the blue image signals configuring the one frame using the average blue image signal, and a pixel gain calculator configured to calculate a pixel gain for correcting a blue image signal of each unit pixel using the blue image signal configuring each unit pixel.

18 Claims, 7 Drawing Sheets

DISPLAY DRIVING APPARATUS AND DISPLAY DRIVING METHOD

CROSS-REFERENCE TO RELATED APPLICATIONS

This application claims the benefit of Korean Patent Application No. 10-2023-0002702, filed on Jan. 9, 2023, which is hereby incorporated by reference in its entirety as if fully set forth herein.

TECHNICAL FIELD

The present disclosure relates to a display driving apparatus and a display driving method.

BACKGROUND

Display devices such as televisions (TVs) or monitors are equipped with a light source such as a light emitting diode (LED) as a backlight for displaying images. LED light sources tend to emit more blue light than the existing fluorescent lights, incandescent lights, or halogen lights.

If exposed to blue light for a long time, blue light may cause eye fatigue and dry eyes, and in severe cases, blue light may be harmful to the body, causing damage to the retina or lens in the eye. In addition, when a display device is used late at night for a long time, secretion of sleep-inducing hormones decreases due to blue light, which may interfere with sleep.

As a method to reduce the amount of blue light emission, a blue light signal component emitted from a light source is artificially reduced or a filter for physically blocking transmission of the blue light signal component is attached.

However, in the method of reducing the blue light signal component as described above, there is a problem in that image quality characteristics change drastically, causing visual discomfort to users who continue to view a screen. While content of a displayed image is very diverse, image quality changes uniformly regardless of the characteristics of the currently displayed image, and thus it is disadvantageously difficult to provide optimal image quality suited to a work environment of a user and it is also difficult to adaptively respond to changes in an input image.

Even in the method of using a physical filter, blue light is simply blocked by a filter regardless of the characteristics of the image, making it difficult to provide image quality suitable for the user and difficult to respond appropriately to changes in the input image.

SUMMARY

To overcome the above problems, an object of the present disclosure is to provide a display driving apparatus and a display driving method for reducing the amount of blue light emission according to the color characteristics of an image input to a display panel, thereby reducing the impact on the body due to blue light and preventing color degradation.

According to an embodiment, a display driving apparatus includes an average calculator for each frame configured to calculate an average blue image signal as an average of blue image signals configuring one frame, a frame gain calculator configured calculate a frame gain for correcting the blue image signals configuring the one frame using the average blue image signal, and a pixel gain calculator configured to calculate a pixel gain for correcting a blue image signal of each unit pixel using the blue image signal configuring each unit pixel.

DETAILED DESCRIPTION

Figure 1:
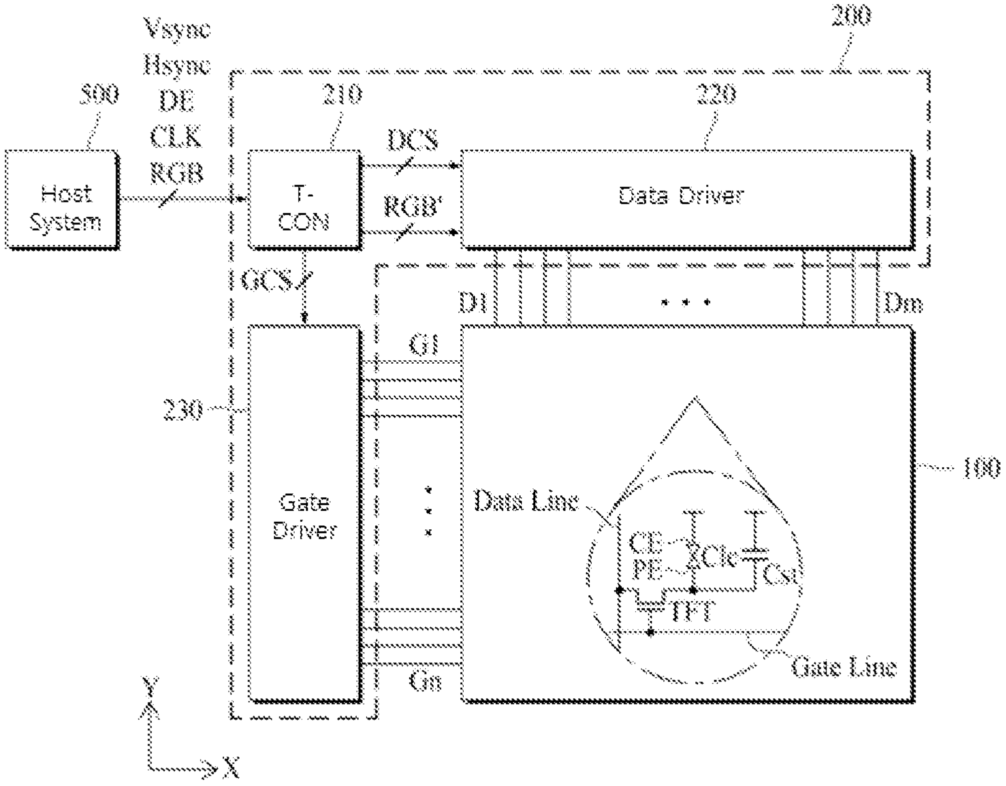
FIG. 1 is a block diagram showing a display apparatus including a display driving apparatus according to an embodiment of the present disclosure.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present disclosure thorough and to fully inform one of ordinary skill in the art to which the present disclosure belongs of the scope of the disclosure. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms “includes,” “has,” “comprises,” and the like should not be construed as being restricted to the means listed thereafter unless specifically stated otherwise. Where an indefinite or definite article is used when referring to a singular noun, this includes a plural of that noun unless something else is specifically stated.

Elements are to be interpreted a margin of error, even if not explicitly stated otherwise.

In describing temporal relationships, terms such as “after,” “subsequent to,” “next to,” “before,” and the like may include cases where any two events are not consecutive, unless the term “immediately” or “directly” is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

It should be understood that the term "at least one" includes all possible combinations of one or more related items. For example, the phrase "at least one of the first, second, and third items" can mean each of the first, second, or third items, as well as any possible combination of two or more of the first, second, and third items.

Features of various embodiments of the present disclosure can be partially or fully combined. As will be clearly appreciated by those skilled in the art, various interactions and operations are technically possible. Embodiments can be practiced independently of each other or in conjunction with each other.

Figure 2A:
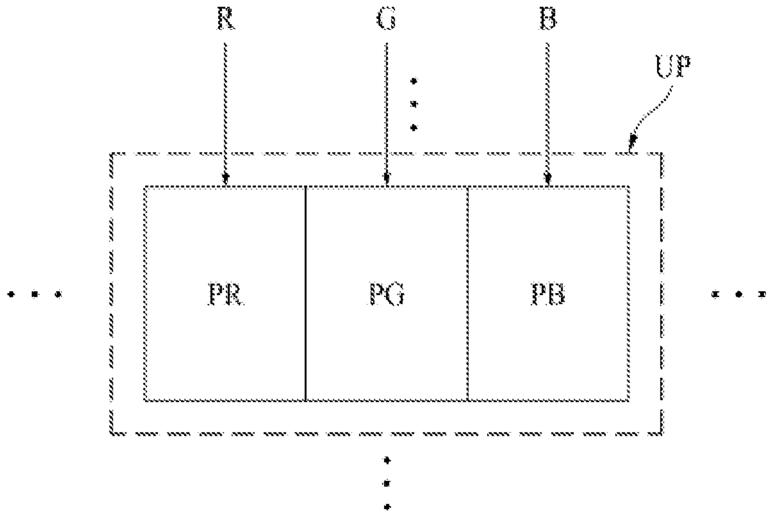
FIG. 2A is a schematic diagram showing a unit pixel of a display panel driven by a display driving apparatus according to an embodiment of the present disclosure.
Figure 2B:
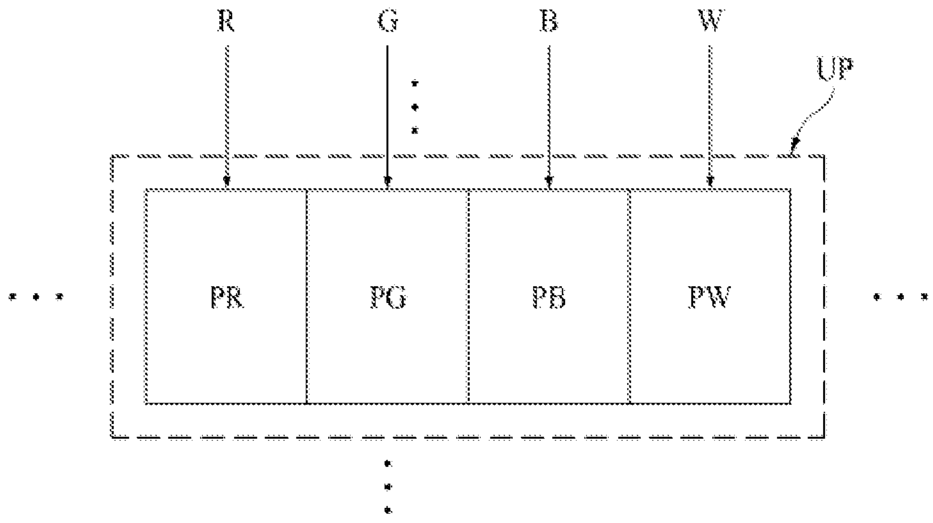
FIG. 2B is a schematic diagram showing another unit pixel of a display panel driven by a display driving apparatus according to an embodiment of the present disclosure.

Hereinafter, with reference to FIGS. 1 to 2B, a display apparatus including a display driving apparatus according to embodiments of the present disclosure will be described in detail. FIG. 1 is a block diagram showing a display apparatus including a display driving apparatus according to an embodiment of the present disclosure. FIG. 2A is a schematic diagram showing a unit pixel of a display panel driven by a display driving apparatus according to an embodiment of the present disclosure. FIG. 2B is a schematic diagram showing another unit pixel of a display panel driven by a display driving apparatus according to an embodiment of the present disclosure.

Referring to FIG. 1, a display apparatus according to an embodiment of the present disclosure may include a display panel 100, and a display driving apparatus 200.

The display panel 100 may be implemented as a flat panel display such as a liquid crystal display (LCD) or an organic light emitting diode (OLED) display. In other words, all types of the display panel 100 may be applied.

However, for convenience of description, hereinafter, a display panel implemented as an LCD will be described as an example of the present disclosure.

The display panel 100 may include a plurality of gate lines G1 to Gn, a plurality of data lines D1 to Dm, and a plurality of pixels (not shown) to display an image of a certain gray level.

Each of the plurality of gate lines G1 to Gn receives a scan pulse during a display period DP. Each of the plurality of data lines D1 to Dm receives a data signal during the display period DP. The plurality of gate lines G1 to Gn and the plurality of data lines D1 to Dm are each positioned to intersect each other on a substrate to define a plurality of pixel areas. Each of a plurality of pixels may include a thin film transistor TFT connected to a gate line and a data line that are adjacent to each other, a pixel electrode PE and a common electrode CE that are connected to the thin film transistor TFT, a liquid crystal capacitor Clc between the pixel electrode PE and the common electrode CE, and a storage capacitor Cst connected to the pixel electrode PE.

As shown in FIG. 2A, the display panel 100 may be configured with a unit pixel UP including a red pixel PR, a green pixel PG, and a blue pixel PB. The red pixel PR, the green pixel PG, and the blue pixel PB that are included in one unit pixel UP may be positioned adjacent to each other. The red pixel PR, the green pixel PG, and the blue pixel PB that are included in the unit pixel UP may receive a red image signal R, a green image signal G, and a blue image signal B from a data driver 220 through a data line to display gray levels corresponding to the red image signal R, the green image signal G, and the blue image signal B, respectively.

As shown in FIG. 2B, the display panel 100 may be configured with a unit pixel UP including the red pixel PR, the green pixel PG, the blue pixel PB, and a white pixel PW. The red pixel PR, the green pixel PG, the blue pixel PB, and the white pixel PW that are included in one unit pixel UP may be positioned adjacent to each other. The red pixel PR, the green pixel PG, the blue pixel PB, and the white pixel PW that are included in the unit pixel UP may receive the red image signal R, the green image signal G, the blue image signal B, and the white image signal W from the data driver 220 through a data line from to display gray levels corresponding to the red image signal R, the green image signal G, the blue image signal B, and the white image signal W, respectively.

The display driving apparatus 200 may include a timing controller 210, the data driver 220, and a gate driver 230, and the timing controller 210, the data driver 220, and the gate driver 230 may be configured with respective chips. However, the present disclosure is not limited thereto, and the display driving apparatus 200 may be configured with separate chips including at least one of the timing controller 210, the data driver 220, and the gate driver 230.

The timing controller 210 may receive various timing signals including a vertical synchronization signal Vsync, a horizontal synchronization signal Hsync, a data enable signal DE, and a clock signal CLK from a host system 500 and generate a gate control signal GCS for controlling the gate driver 230 and a data control signal DCS for controlling the data driver 220. The timing controller 210 receives an image signal RGB from an external system, converts the image signal RGB into an image signal RGB' in a format to be processed by the data driver 220, and outputs the image signal RGB'.

The data driver 220 may receive the data control signal DCS and the image signal RGB' from the timing controller 210. The data control signal DCS may include a source start pulse SSP, a source sampling clock SSC, and a source output enable signal SOE. The source start pulse SSP controls a data sampling start timing of the data driver 220. The source sampling clock SSC is a clock signal for controlling a data sampling timing of data. The source output enable signal SOE controls an output timing.

The data driver 220 converts the received image signal RGB' into a data signal in an analog form and supplies the data signal to pixels through the plurality of data lines D1 to Dm.

The gate driver 230 receives the gate control signal GCS from the timing controller 210. The gate control signal GCS may include a gate start pulse GSP, a gate shift clock GSC, and a gate output enable signal. The gate driver 230 generates a gate pulse (or scan pulse) synchronized with a data signal through the received gate control signal GCS, shifts the generated gate pulse, and sequentially supplies the gate pulse to the gate lines G1 to Gn. To this end, the gate driver 230 may include a plurality of gate drive ICs (not shown). The gate drive ICs sequentially supply the gate pulse synchronized with the data signal to the gate lines G1 to Gn according to control of the timing controller 210 and select a data line on which the data signal is written. The gate pulse swings between a gate high voltage and a gate low voltage.

The display driving apparatus 200 according to an embodiment of the present disclosure may include a blue light controller 240 (refer to FIG. 3) that controls emission of blue light of the display panel 100. At least one of the timing controller 210, the data driver 220, and the gate driver 230 described above may include the blue light controller 240. However, the present disclosure is not limited thereto, and the blue light controller 240 may be included in one chip that includes all of the timing controller 210, the data driver 220, and the gate driver 230, or the blue light controller 240 may be included in one chip including at least one of the timing controller 210, the data driver 220, and the gate driver 230.

The host system 500 converts digital image data into a format suitable for display on the display panel 100. The host system 500 transmits timing signals Vsync, Hsync, GCS, and DCS along with the image signal RGB converted from digital image data, to the timing controller 210. The host system is implemented as one of a television system, a set-top box, a navigation system, a DVD player, a Blu-ray player, a personal computer (PC), a home theater system, and a phone system and receives an input image.

Figure 4:
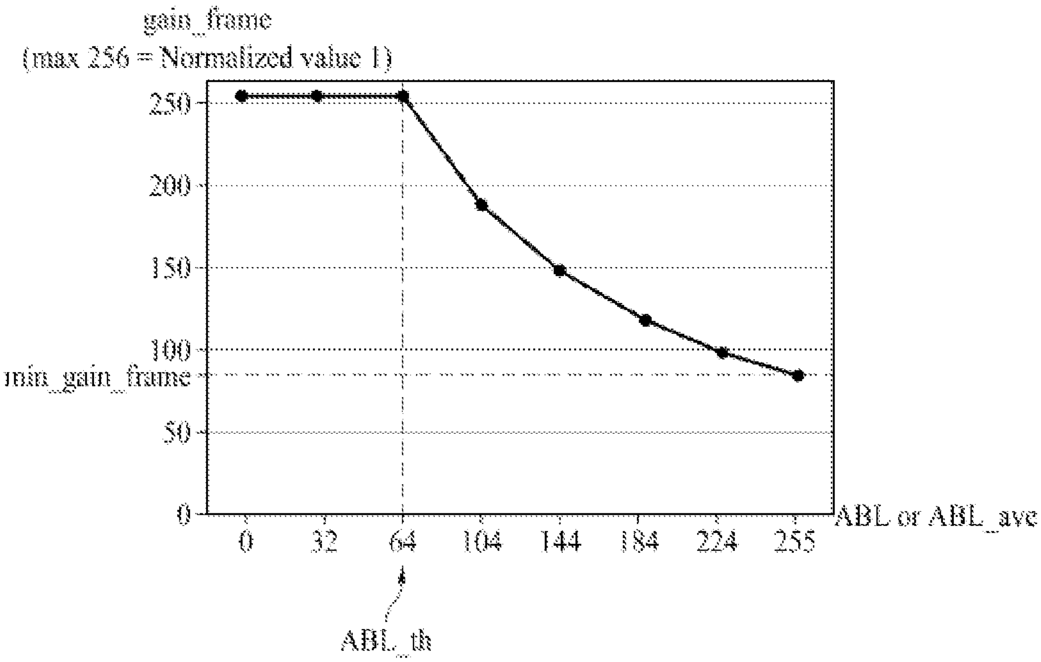
FIG. 4 is a graph showing a frame gain for an average of average blue image signals according to an embodiment of the present disclosure.
Figure 5:
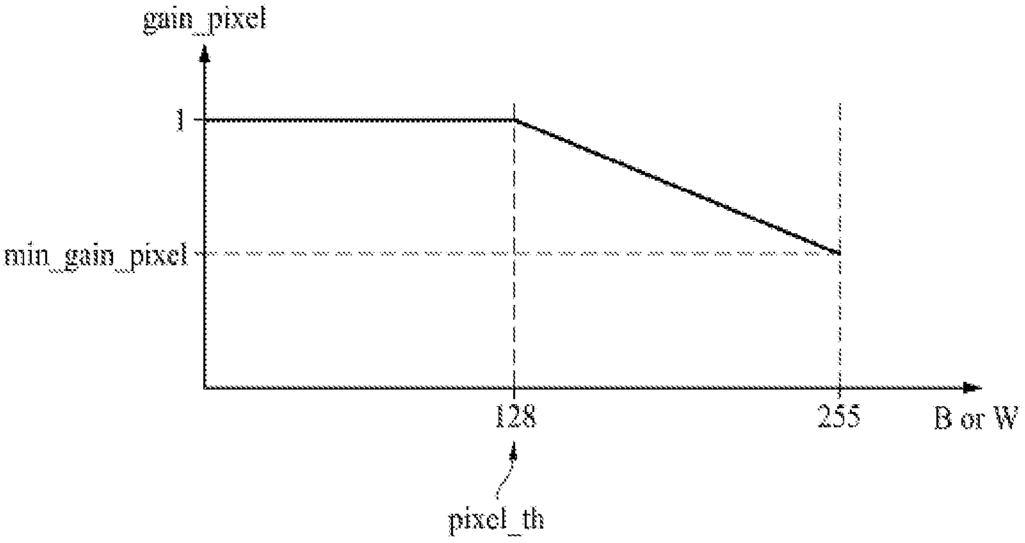
FIG. 5 is a graph showing a pixel gain based on a blue image signal of each unit pixel according to an embodiment of the present disclosure.

Hereinafter, with reference to FIGS. 3 to 5, a blue light controller included in a display driving apparatus according to an embodiment of the present disclosure will be described in detail.

Figure 3:
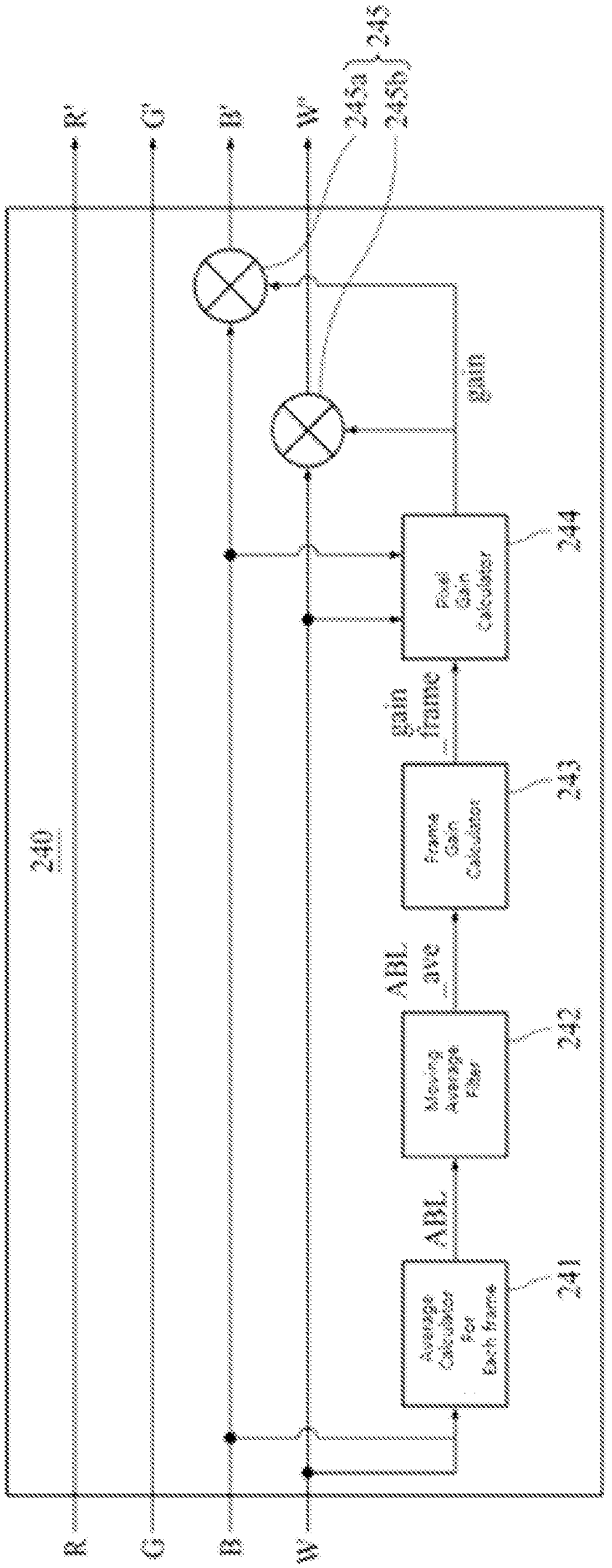
FIG. 3 is a schematic block diagram of a blue light controller according to an embodiment of the present disclosure.

FIG. 3 is a schematic block diagram of a blue light controller according to an embodiment of the present disclosure. FIG. 4 is a graph showing a frame gain for an average of average blue image signals according to an embodiment of the present disclosure. FIG. 5 is a graph showing a pixel gain based on a blue image signal of each unit pixel according to an embodiment of the present disclosure.

The blue light controller 240 according to an embodiment of the present disclosure determines the color characteristics of an image displayed on the display panel 100 and controls blue light emitted from the display panel 100 to reduce physical damage to users caused by blue light. To this end, as shown in FIG. 3, the blue light controller 240 may include an average calculator for each frame 241, a moving average filter 242, a frame gain calculator 243, a pixel gain calculator 244, and a gain applier 245.

The average calculator for each frame 241 may calculate an average of image signals configuring one frame to recognize color characteristics to be displayed on one frame. In detail, the average calculator for each frame 241 calculates an average of the blue image signals B configuring one frame. That is, the average calculator for each frame 241 adds up the blue image signals input to the blue pixels PB of each the unit pixel UP configuring one frame and divides the added blue image signals by the total number of the unit pixel UP to calculate an average blue image signal ABL.

According to another embodiment of the present disclosure, as shown in FIG. 2B, when the display panel 100 includes the white pixel PW, white light includes light corresponding to a wavelength of blue light, and thus to control emission of blue light by white light, the average calculator for each frame 241 may calculate an average white image signal along with the average blue image signal ABL. That is, the average calculator for each frame 241 may calculate each of an average of the blue image signals B configuring one frame and an average of the white image signals W.

According to an embodiment of the present disclosure, the average calculator for each frame 241 may calculate the average blue image signal ABL and recognize an amount of blue light emission of an image displayed on the corresponding frame using the average blue image signal ABL. That is, the average calculator for each frame 241 may recognize the color characteristics of the corresponding frame by recognizing the amount of blue light emission of the image displayed on the corresponding frame.

According to an embodiment of the present disclosure, the average blue image signal ABL may be calculated after all of the blue image signals B configuring one frame are input, and thus a gain calculated after all of the average blue image signals ABL for one frame may be applied to the blue image signal B configuring a next frame.

The moving average filter 242 is a filter that calculates an average ABL_ave of average blue image signals of a plurality of consecutive frames. For example, the moving average filter 242 may calculate the average ABL_ave of average blue image signals of 16 consecutive frames. That is, when an image signal of an $N^{th}$ frame is input and an average of previous 16 consecutive frames is calculate, the average ABL_ave of average blue image signals of $(N-16)^{th}$ to $(N-1)^{th}$ frames may be calculated and transmitted to the frame gain calculator 243. Accordingly, the average ABL_ave of average blue image signals of a plurality of consecutive frames is calculated, and thus a frame gain gain_frame may be calculated by applying the color characteristics of consecutive images. In this case, the number of frames for calculating the average ABL_ave of average blue image signals is not limited to 16 as described above, and may be set to a number for recognizing the color characteristics of images, but the present disclosure is not limited thereto, and the number of frames for calculating the average ABL_ave of average blue image signals may be applied variously.

According to an embodiment of the present disclosure, as shown in FIG. 2B, when the display panel 100 includes the white pixel PW, white light includes light corresponding to a wavelength of blue light, and thus, to control emission of blue light by white light, the moving average filter 242 may calculate an average of the average white image signals of the plurality of consecutive frames, calculated by the average calculator for each frame 241. That is, the moving average filter 242 may calculate each of the average ABL_ave of average blue image signals of the plurality of consecutive frames and an average of the average white image signals.

Although not shown, the display driving apparatus 200 may further a determination unit to apply a filter, which controls the moving average filter 242 not to operate when the color characteristics of an image of the current frame (Frame N) and the previous frame (Frame N-1) change rapidly by comparing the average blue image signal ABL (Frame N) of the current frame (Frame N) and the average blue image signal ABL (Frame N-1) of the previous frame (Frame N-1). In detail, the determination unit to apply a filter may first calculate an absolute value of a difference between the average blue image signal ABL (Frame N) of the current frame (Frame N) and the average blue image signal ABL (Frame N-1) of the previous frame (Frame N-1), and the determination unit to apply a filter may compare the absolute value of the difference between the calculated the average blue image signal ABL (Frame N) of the current frame and the average blue image signal ABL (Frame N-1) of the previous frame (Frame N-1) with a threshold signal change amount change_th, as shown in Expression 1 below.

$$|\text{ABL(Frame } N) - \text{ABL (frame } N\text{-1})| < \text{change\_}th \quad \text{[Expression 1]}$$

When the absolute value of the difference between the average blue image signal ABL (Frame N) of the current frame and the average blue image signal ABL (Frame N-1) of the previous frame (Frame N-1) is greater than the threshold signal change amount change_th, the determination unit to apply a filter may control the moving average filter 242 not to operate and transmit the average blue image signal ABL (Frame N) of the current frame (Frame N) as the average ABL_ave of average blue image signals to the frame gain calculator 243 described below. When the absolute value of the difference between the average blue image signal ABL (Frame N) of the current frame (Frame N) and the average blue image signal ABL (Frame N-1) of the previous frame (Frame N-1) is smaller than the threshold signal change amount change_th, the determination unit to apply a filter may apply the moving average filter 242 to calculate the average ABL_ave of average blue image signals for a plurality of frames and transmit the calculated average to the frame gain calculator 243, as described above.

The determination unit to apply a filter may calculate an absolute value of a difference between the average white image signal of the current frame (Frame N) and the average white image signal of the previous frame (Frame N-1). Accordingly, the determination unit to apply a filter may determine whether to apply the moving average filter 242 using at least one of a comparison result between the average blue image signal ABL (Frame N) of the current frame (Frame N) and the average blue image signal ABL (Frame N-1) of the previous frame (Frame N-1) and the threshold signal change amount change_th, and a comparison result between an absolute value of a difference between the average white image signal of the current frame (Frame N) and the average white image signal of the previous frame (Frame N-1) and the threshold signal change amount change_th.

The frame gain calculator 243 calculates the frame gain gain_frame according to the average ABL_ave of average blue image signals. In detail, as shown in FIG. 4, the frame gain calculator 243 may determine a value of the frame gain gain_frame according to the average ABL_ave of average blue image signals based on a predefined threshold average blue image signal ABL_th. In detail, when the average ABL_ave of average blue image signals is smaller than the threshold average blue image signal ABL_th, the frame gain calculator 243 may determine the frame gain gain_frame as 1, and when the average ABL_ave of average blue image signals is greater than or equal to the threshold average blue image signal ABL_th, the frame gain calculator 243 may determine the frame gain gain_frame to be a smaller value as the average ABL_ave of average blue image signals increases. In this case, when the average ABL_ave of average blue image signals is a maximum value, the frame gain gain_frame may be a minimum frame gain min_gain_frame, and the minimum frame gain min_gain_frame may be a predefined value and may be determined according to unique color characteristics of the display panel 100. In this case, the threshold average blue image signal ABL_th may be a predefined value and may be determined according to the unique color characteristics of the display panel 100.

According to an embodiment of the present disclosure, the frame gain gain_frame has a value of 1 when a blue image signal of one frame is smaller than the predefined threshold average blue image signal ABL_th, and thus color degradation may be prevented, and the frame gain gain_frame has a smaller value than 1 when the blue image signal of one frame is greater than the predefined threshold average blue image signal ABL_th, and as the size of the blue image signal is increased, emission of blue light may be further reduced, thereby minimizing physical impact of blue light on users.

To this end, as described above, the frame gain calculator 243 may include a frame gain lookup table LUT_gain_frame that is a lookup table of the frame gain gain_frame for the average ABL_ave of average blue image signals, and the frame gain lookup table LUT_gain_frame may include the frame gain gain_frame for some values of the predefined average ABL_ave of average blue image signals.

The frame gain gain_frame for values of average ABL_ave of average blue image signals that are not included in the frame gain lookup table LUT_gain_frame may be calculated by applying interpolation to the frame gain gain_frame for some values of the predefined average ABL_ave of average blue image signals included in the frame gain lookup table LUT_gain_frame.

The frame gain gain_frame for values of the average ABL_ave of average blue image signals that are not included in the frame gain lookup table LUT_gain_frame may be calculated using at least one of various interpolations such as linear interpolation, polynomial interpolation, and spline interpolation.

However, the present disclosure is not limited thereto, and the frame gain calculator 243 may also calculate the frame gain gain_frame for the average ABL_ave of average blue image signals through a function.

According to an embodiment of the present disclosure, as shown in FIG. 2B, when the display panel 100 includes the white pixel PW, white light contains light corresponding to a wavelength of blue light, and thus to control the amount of blue light emission by white light, the frame gain calculator 243 may include a lookup table of the frame gain gain_frame for an average of average white image signals, and a frame gain lookup table for white may include the frame gain gain_frame for some values of a predefined average of average white image signals to calculate the frame gain gain_frame for an average of average white image signals.

According to an embodiment of the present disclosure, the frame gain gain_frame may be a gain applied to blue image signals B configuring one frame, and the same frame gain gain_frame may be applied to the blue image signals B configuring one frame.

The pixel gain calculator 244 calculates a pixel gain gain_pixel using the blue image signal B for each unit pixel UP. In detail, as shown in FIG. 5, the pixel gain calculator 244 may determine a pixel gain gain_pixel according to the blue image signal B for each pixel based on a predefined threshold pixel blue image signal pixel_th. That is, when the blue image signal B of each blue pixel PB is smaller than the threshold pixel blue image signal pixel_th, the pixel gain calculator 244 may determine the pixel gain gain_pixel as 1, and when the blue image signal B of the corresponding blue pixel PB is larger than the threshold pixel blue image signal pixel_th, the pixel gain calculator 244 may determine the pixel gain gain_pixel as a value smaller than 1 and determine the pixel gain gain_pixel as a small value as the size of the blue image signal B is increased. In this case, when the blue image signal B has a maximum value, the frame gain gain_frame may be the minimum pixel gain min_gain_pixel, and a value of the minimum pixel gain min_gain_pixel may be a predefined value and may be determined according to unique color characteristics of the display panel 100. In addition, the threshold pixel blue image signal pixel_th may be a predefined value and may be determined according to the unique color characteristics of the display panel 100 like the minimum pixel gain min_gain_pixel.

The pixel gain calculator 244 may include a lookup table LUT_gain_frame of a pixel gain gain_pixel of the blue image signal B, and the pixel gain lookup table LUT_gain_pixel may include the pixel gain gain_pixel for all values of the blue image signal B or may include the pixel gain gain_pixel for some predefined values of the blue image signal B. When the pixel gain lookup table LUT_gain_pixel includes a pixel gain gain_pixel for some predefined values of the blue image signal B, the pixel gain gain_pixel for values of the blue image signal B, which are not included in the pixel gain lookup table LUT_gain_pixel, may be calculated by applying interpolation to pixel gains gain_pixel for values of the blue image signal B, which are included in the pixel gain lookup table LUT_gain_pixel. In this case, the pixel gain gain_pixel for values of the blue image signal B, which are not included in the pixel gain lookup table LUT_gain_pixel, may be calculated using at least one of various interpolations such as linear interpolation, polynomial interpolation, and spline interpolation.

However, the present disclosure is not limited thereto, and the pixel gain calculator 244 may also calculate the pixel gain gain_pixel through a function of the pixel gain gain_pixel for the blue image signal B.

According to an embodiment of the present disclosure, as shown in FIG. 2B, when the display panel 100 includes the white pixel PW, white light contains light corresponding to a wavelength of blue light, and thus to control emission of blue light by white light, the pixel gain calculator 244 may include a lookup table of the pixel gain gain_pixel for the white image signal W, and a pixel gain lookup table for white may include the pixel gain gain_pixel for all values of the white image signal or may include the pixel gain gain_pixel for some predefined values of the white image signal W to calculate the pixel gain gain_pixel for values of the white image signal W.

According to an embodiment of the present disclosure, unlike the frame gain gain_frame applied in the same way to the blue image signals B configuring one frame, the pixel gain gain_pixel may be calculated according to the blue image signal B of each unit pixel UP, and thus different pixel gains gain_pixel may be applied to the respective unit pixels UP.

The pixel gain calculator 244 may calculate a final gain to be applied to the blue image signal B using the frame gain gain_frame calculated by the frame gain calculator 243 and the pixel gain gain_pixel. In detail, the pixel gain calculator 244 may calculate and output the final gain by multiplying the frame gain gain_frame and the pixel gain gain_pixel.

According to another embodiment of the present disclosure, the pixel gain calculator 244 may calculate a final gain for the white image signal W, which is to be applied to the white image signal W, using the frame gain gain_frame calculated by the frame gain calculator 243 and the pixel gain gain_pixel for the white image signal W. In detail, the pixel gain calculator 244 may calculate and output the final gain for white by multiplying the frame gain gain_frame and the pixel gain gain_pixel for the white image signal W.

Gain appliers 245 and 245*a* may output corrected blue image signal B' corrected by applying the final gain calculated by the pixel gain calculator 244 to the blue image signal B. In addition, gain appliers 245 and 245*b* may output corrected white image signal W' corrected by applying the final gain calculated for white by the pixel gain calculator 244 to the white image signal W as well as the corrected blue image signal B'.

According to another embodiment of the present disclosure, the image signal may be corrected according to color characteristics of each frame and each unit pixel UP, and thus it may be possible to prevent color degradation and reduce the amount of blue light emission that physically affect users from the display panel 100.

Figure 6:
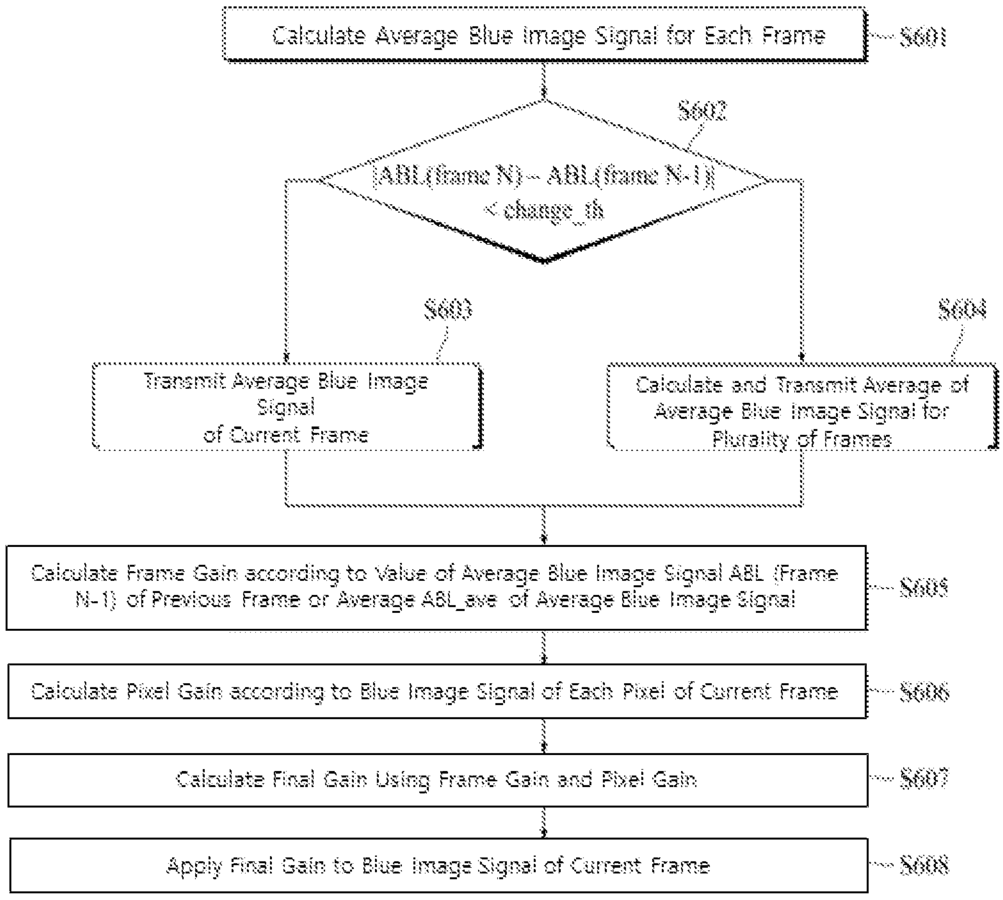
FIG. 6 is a flowchart showing a display driving method according to an embodiment of the present disclosure.

Hereinafter, a display driving method according to an embodiment of the present disclosure will be described in detail with reference to FIG. 6. FIG. 6 is a flowchart showing a display driving method according to an embodiment of the present disclosure.

Referring to FIG. 6, the average calculator for each frame 241 calculates the average blue image signal ABL for each frame (S601). In detail, the average calculator for each frame 241 calculates an average of the blue image signals B configuring one frame. That is, the average calculator for each frame 241 adds up the blue image signals B input to the blue pixels PB of the unit pixel UP that configures one frame and divides the added value by the total number of the unit pixel UP to calculate the average blue image signal ABL.

According to another embodiment of the present disclosure, as shown in FIG. 2B, when the display panel 100 includes the white pixel PW, light corresponding to a wavelength of blue light is emitted together as white light is emitted, and thus to control emission of blue light by white light, the average calculator for each frame 241 may calculate an average white image signal with the average blue image signal ABL. That is, the average calculator for each frame 241 may calculate each of the average blue image signal ABL that is an average of blue image signals configuring one frame and an average of the white image signals W.

Then, the determination unit to apply a filter calculates an absolute value of a difference between the average blue image signal ABL (Frame N) of the current frame (Frame N) and the average blue image signal ABL (Frame N-1) of the previous frame (Frame N-1) and compares the absolute value of the difference between the calculated average blue image signal ABL (Frame N) of the current frame and the average blue image signal ABL (Frame N-1) of the previous frame with the threshold signal change amount change_th (S602). The determination unit to apply a filter may also calculate an absolute value of a difference between the average white image signal of the current frame (Frame N) and the average white image signal of the previous frame (Frame N-1). Thus, the determination unit to apply a filter may determine whether to apply the moving average filter 242 using at least one of a comparison result between the average blue image signal ABL (Frame N) of the current frame (Frame N) and the average blue image signal ABL (Frame N-1) of the previous frame (Frame N-1) and the threshold signal change amount change_th, and a comparison result between an absolute value of a difference between the average white image signal of the current frame (Frame N) and the average white image signal of the previous frame (Frame N-1) and the threshold signal change amount change_th.

Then, when the absolute value of the difference between the average blue image signal ABL (Frame N) of the current frame and the average blue image signal ABL (Frame N-1) of the previous frame (Frame N-1) is greater than the threshold signal change amount change_th, the determination unit to apply a filter may control the moving average filter 242 not to operate and transmit the average blue image signal ABL (Frame N) of the current frame (Frame N) as the average ABL_ave of average blue image signals to the frame gain calculator 243 described below (S603).

When the absolute value of the difference between the average blue image signal ABL (Frame N) of the current frame (Frame N) and the average blue image signal ABL (Frame N-1) of the previous frame (Frame N-1) is smaller than the threshold signal change amount change_th, the determination unit to apply a filter may apply the moving average filter 242 to calculate the average ABL_ave of average blue image signals for a plurality of frames and transmit the calculated average to the frame gain calculator 243, as described above (S604). In detail, the moving average filter 242 may calculate the average ABL_ave of average blue image signals of a plurality of consecutive frames and apply the color characteristics of consecutive images to calculate the frame gain gain_frame.

Then, the frame gain calculator 243 calculates the frame gain gain_frame according to the average ABL_ave of average blue image signals (S605). In detail, as shown in FIG. 4, the frame gain calculator 243 may determine a value of the frame gain gain_frame according to the average ABL_ave of average blue image signals based on a predefined threshold average blue image signal ABL_th. That is, when the average ABL_ave of average blue image signals is smaller than the threshold average blue image signal ABL_th, the frame gain calculator 243 may determine the frame gain gain_frame as 1, and when the average ABL_ave of average blue image signals is greater than the threshold average blue image signal ABL_th, the frame gain calculator 243 may determine the frame gain gain_frame to be smaller value as the average ABL_ave of average blue image signals increases compared with the threshold average blue image signal ABL_th. To this end, the frame gain calculator 243 may include a frame gain lookup table LUT_gain_frame that is a looup table of the frame gain gain_frame for the average ABL_ave of average blue image signals, and the frame gain lookup table LUT_gain_frame may also include the frame gain gain_frame for some values of the predefined average ABL_ave of average blue image signals. The frame gain gain_frame of values of the average ABL_ave of average blue image signals, which are not included in the frame gain lookup table LUT_gain_frame, may be calculated by applying interpolation to the frame gain gain_frame for some values of the predefined average ABL_ave of average blue image signals, which are included in the frame gain lookup table LUT_gain_frame.

As shown in FIG. 2B, when the display panel 100 includes the white pixel PW, white light contains light corresponding to a wavelength of blue light, and thus to control blue light emission by white light, the frame gain calculator 243 may include a lookup table of the frame gain gain_frame for an average of average white image signals, and a frame gain lookup table for white may include the frame gain gain_frame for some values of a predefined average of average white image signals to calculate the frame gain gain_frame for an average of average white image signals.

Then, the pixel gain calculator 244 calculates the pixel gain gain_pixel according to the blue image signal B of each pixel of the current frame (S606). In detail, the pixel gain calculator 244 may determine the pixel gain gain_pixel according to the blue image signal B for each unit pixel UP based on the predefined threshold pixel blue image signal pixel_th. That is, when the blue image signal B of each unit pixel UP is smaller than the threshold pixel blue image signal pixel_th, the pixel gain calculator 244 may determine the pixel gain gain_pixel as 1, and when the blue image signal B is greater than the threshold pixel blue image signal pixel_th, the pixel gain calculator 244 may determine the pixel gain gain_pixel as a smaller value than 1 and determine the pixel gain gain_pixel to be smaller value as the blue image signal B increases.

As shown in FIG. 2B, when the display panel 100 includes the white pixel PW, white light contains light corresponding to a wavelength of blue light, and thus to control blue light emission by white light, the pixel gain calculator 244 may determine the pixel gain gain_pixel of the white image signal W for each unit pixel UP. To this end, the pixel gain calculator 244 may include a lookup table of the pixel gain gain_pixel for the white image signal W, and a pixel gain lookup table for white may include the pixel gain gain_pixel for all values of white image signals and include the pixel gain gain_pixel for some predefined values of the white image signal W to calculate the pixel gain gain_pixel for a value of the white image signal W.

Then, the pixel gain calculator 244 may calculate a final gain using the frame gain gain_frame and the pixel gain gain_pixel (S607). In detail, the pixel gain calculator 244 may calculate and output the final gain by multiplying the frame gain gain_frame and the pixel gain gain_pixel.

According to an embodiment of the present disclosure, the frame gain gain_frame may be a gain applied to blue image signals B configuring one frame, and the same frame gain gain_frame may be applied to the blue image signals B configuring one frame. In contrast, unlike the aforementioned frame gain gain_frame, the pixel gain gain_pixel is calculated according to the blue image signal B of each unit pixel UP, and thus different pixel gains gain_pixel may be applied to the respective unit pixels UP.

The pixel gain calculator 244 may calculate a final gain for the white image signal W, which is to be applied to the white image signal W, using the frame gain gain_frame calculated by the frame gain calculator 243 and the pixel gain gain_pixel for the white image signal W. In detail, the pixel gain calculator 244 may calculate and output the final gain for white by multiplying the frame gain gain_frame and the pixel gain gain_pixel for the white image signal W.

Then, the gain applier 245 applies the final gain to the blue image signal B of the current frame (S608). That is, the gain applier 245 may output the corrected blue image signal B' corrected by applying the final gain calculated by the pixel gain calculator 244 to the blue image signal B. The gain applier 245 may output corrected white image signal W' corrected by applying the final gain calculated for white by the pixel gain calculator 244 to the white image signal W.

The display driving apparatus and display driving method according to an embodiment of the present disclosure may reduce the amount of blue light emission according to the color characteristics of an image input to the display panel, thereby reducing the impact on the body due to blue light and preventing color degradation.

It will be appreciated by those skilled in the art to which the present disclosure belongs that the disclosure described above may be practiced in other specific forms without altering its technical ideas or essential features.

The methods described herein may be implemented, at least in part, using one or more computer programs or components. This component may be provided as a series of computer instructions on a computer-readable medium or machine-readable medium containing volatile and non-volatile memory. The instructions may be provided as software or firmware, and may be implemented, in whole or in part, in hardware components such as ASICs, FPGAs, DSPs, or other similar devices. The instructions may be configured to be executed by one or more processors or other hardware components and perform all or part of the methods and procedures disclosed herein or cause when executed by the processor or the hardware components to perform all or part of the methods and procedures disclosed herein.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A display driving apparatus comprising:
an average calculator for each frame configured to calculate an average blue image signal as an average of blue image signals configuring one frame;
a frame gain calculator configured to calculate a frame gain for correcting the blue image signals configuring the one frame using the average blue image signal;
a pixel gain calculator configured to calculate a pixel gain for correcting a blue image signal of each unit pixel using the blue image signal configuring the each unit pixel; and
a gain applier configured to apply a final gain to the blue image signal,
wherein the final gain is calculated by multiplying the frame gain and the pixel gain.

2. The display driving apparatus of claim 1, further comprising:
a moving average filter configured to calculate an average of the average blue image signals of a plurality of consecutive frames.

3. The display driving apparatus of claim 2, further comprising:
a determination unit to apply a filter, the determination unit configured to output an average blue image signal of a current frame as the average of the average blue image signals based on that the average blue image signal of the current frame is compared with an average blue image signal of a previous frame and an absolute value of a difference between the average blue image signal of the current frame and the average blue image signal of the previous frame is greater than or equal to a predefined threshold signal change amount.

4. The display driving apparatus of claim 2, wherein the frame gain calculator includes a frame gain lookup table configured to determine the frame gain as 1 based on that the average of the average blue image signals is smaller than a predefined threshold average blue image signal, and determine the frame gain as a smaller value than 1 as the average of the average blue image signals increases based on that the average of the average blue image signals is greater than or equal to the predefined threshold average blue image signal.

5. The display driving apparatus of claim 4, wherein:
the frame gain lookup table includes a frame gain for an average of some predefined values of the average blue image signals; and
the frame gain calculator is configured to calculate a frame gain for the average of the average blue image signals that are not included in the frame gain lookup table by applying interpolation to frame gains for averages of average blue image signals included in the frame gain lookup table.

6. The display driving apparatus of claim 5, wherein the pixel gain calculator includes a pixel gain lookup table configured to determine the pixel gain as 1 based on that the blue image signal is smaller than a predefined threshold blue image signal, and determine the pixel gain as a smaller value than 1 as the blue image signal increases based on that the blue image signal is greater than or equal to the predefined threshold blue image signal.

7. The display driving apparatus of claim 1, wherein:
the average calculator for each frame is further configured to calculate an average white image signal as an average of white image signals configuring the one frame; and
the frame gain calculator includes a frame gain lookup table configured to determine a frame gain for the white image signal as 1 based on that an average of the average white image signal is smaller than a predefined threshold average white image signal, and determine the frame gain for the white image signal as a smaller value than 1 as the average of the average white image signals increases based on that the average of the average white image signal is greater than or equal to the predefined threshold average white image signal.

8. A display driving method comprising:
calculating an average blue image signal as an average of blue image signals configuring one frame, by an average calculator for each frame;
calculating an average of the average blue image signals of a plurality of consecutive frames through a moving average filter;
calculating a frame gain for correcting the blue image signals configuring the one frame using the average blue image signal, by a frame gain calculator;
calculating a pixel gain for correcting a blue image signal of each unit pixel using the blue image signal configuring each unit pixel, by a pixel gain calculator,
calculating a final gain by multiplying the frame gain and the pixel gain, and
applying the final gain to the blue image signal.

9. The display driving method of claim 8, wherein outputting an average blue image signal of a current frame as the average of the average blue image signals based on that the average blue image signal of the current frame is compared with an average blue image signal of a previous frame and an absolute value of a difference between the average blue image signal of the current frame and the average blue image signal of the previous frame is greater than or equal to a predefined threshold signal change amount.

10. The display driving method of claim 8, wherein the calculating the frame gain includes calculating the frame gain using a frame gain lookup table configured to determine the frame gain as 1 based on that the average of the average blue image signals is smaller than a predefined threshold average blue image signal, and determine the frame gain as a smaller value than 1 as the average of the average blue image signals increases based on that the average of the average blue image signals is greater than or equal to the predefined threshold average blue image signal.

11. The display driving method of claim 10, wherein the calculating the frame gain includes calculating a frame gain for the average of the average blue image signals that are not included in the frame gain lookup table by applying interpolation to frame gains for averages of average blue image signals included in the frame gain lookup table.

12. The display driving method of claim 10, further comprising:
calculating an average white image signal as an average of white image signals configuring the one frame, by the average calculator for each frame; and
calculating a frame gain for the white image signal for correcting white image signals configuring the one frame using the average white image signal, by the frame gain calculator, wherein the calculating the frame gain for the white image signal includes calculating the frame gain for the white image signal using a frame gain lookup table configured to determine the frame gain for the white image signal as 1 based on that an average of the average white image signals is smaller than a predefined threshold average white image signal, and determine the frame gain for the white image signal as a smaller value than 1 as the average of the average white image signals increases based on that the average of the average white image signals is greater than or equal to the predefined threshold average white image signal.

13. The display driving method of claim 8, wherein the calculating the pixel gain includes calculating the pixel gain using a pixel gain lookup table configured to determine the pixel gain as 1 based on that the blue image signal is smaller than a predefined threshold blue image signal, and determine the pixel gain as a smaller value than 1 as the blue image signal increases based on that the blue image signal is greater than or equal to the predefined threshold blue image signal.

14. A display apparatus comprising:

a display panel; and a controller configured to calculate an average blue image signal as an average of blue image signals configuring one frame, calculate a frame gain for correcting the blue image signals configuring the one frame using the average blue image signal, calculate a pixel gain for correcting a blue image signal of each unit pixel using the blue image signal configuring the each unit pixel, calculate a final gain by multiplying the frame gain and the pixel gain, and apply the final gain to the blue image signal.

15. The display apparatus of claim 14, further comprising:

a moving average filter configured to calculate an average of the average blue image signals of a plurality of consecutive frames.

16. The display apparatus of claim 15, further comprising:

a determination unit to apply a filter, the determination unit configured to output an average blue image signal of a current frame as the average of the average blue image signals based on that the average blue image signal of the current frame is compared with an average blue image signal of a previous frame and an absolute value of a difference between the average blue image signal of the current frame and the average blue image signal of the previous frame is greater than or equal to a predefined threshold signal change amount.

17. The display apparatus of claim 16, wherein the controller includes a frame gain lookup table configured to determine the frame gain as 1 based on that the average of the average blue image signals is smaller than a predefined threshold average blue image signal, and determine the frame gain as a smaller value than 1 as the average of the average blue image signals increases based on that the average of the average blue image signals is greater than or equal to the predefined threshold average blue image signal.

18. The display apparatus of claim 17, wherein:

the frame gain lookup table includes a frame gain of an average of some predefined values of the average blue image signals; and the controller is configured to calculate a frame gain for the average of the average blue image signals that are not included in the frame gain lookup table by applying interpolation to frame gains for averages of average blue image signals included in the frame gain lookup table.

* * * * *